US006093248A

United States Patent [19]

Kohl et al.

[11] Patent Number: 6,093,248

[45] Date of Patent: Jul. 25, 2000

[54] APPARATUS FOR APPLYING A LIQUID OR PASTY MEDIUM ONTO A TRAVELING MATERIAL WEB

[75] Inventors: Bernhard Kohl; Rudiger Kurtz; Martin Kustermann, all of Heidenheim; Oswald Satzger, Giengen; Michael Trefz, Heidenheim, all of Germany

[73] Assignee: Voith Sulzer Papiermaschinen GmbH, Heidenheim, Germany

[21] Appl. No.: 08/803,540

[22] Filed: Feb. 20, 1997

[30] Foreign Application Priority Data

Feb. 21, 1996 [DE] Germany .......................... 196 06 459

[51] Int. Cl.[7] .......................... B60P 3/04

[52] U.S. Cl. .......................... 118/414; 427/209; 118/117; 118/123; 118/122

[58] Field of Search .......................... 118/115, 117, 118/413, 316, DIG. 4, 414, 206, 123, 118, 122, 325; 427/356, 211, 365, 209

[56] References Cited

U.S. PATENT DOCUMENTS

| | | | |
|---|---|---|---|
| 748,101 | 9/1903 | Goessmann | 118/117 |
| 1,346,638 | 7/1920 | Crook et al. | 427/365 |
| 2,227,494 | 1/1941 | Gold | 427/369 |
| 2,252,204 | 8/1941 | Reilly . | |
| 2,252,345 | 8/1941 | Johnson | 118/119 |
| 2,333,629 | 11/1943 | Beadle, Sr. | 118/117 |
| 2,542,819 | 2/1951 | Kropa | 427/365 |
| 2,729,192 | 1/1956 | Warner . | |
| 2,946,307 | 7/1960 | Warner . | |
| 3,089,460 | 5/1963 | Mahoney et al. | 118/117 |
| 3,303,816 | 2/1967 | Lauring | 118/DIG. 4 |
| 3,654,896 | 4/1972 | Marx et al. | 118/DIG. 4 |
| 4,075,976 | 2/1978 | Clayton | 118/DIG. 4 |
| 4,109,611 | 8/1978 | Fahrni et al. | 118/DIG. 4 |
| 4,233,346 | 11/1980 | Kerkhofs | 118/DIG. 4 |
| 4,279,964 | 7/1981 | Heller | 427/365 |
| 4,357,370 | 11/1982 | Alhiid . | |
| 4,363,833 | 12/1982 | Blaak | 427/365 |
| 4,413,586 | 11/1983 | Wohrle | 118/249 |
| 4,578,288 | 3/1986 | Lare et al. | 118/117 |
| 4,679,524 | 7/1987 | Eklund | 118/405 |
| 4,712,506 | 12/1987 | Rantanen et al. | 118/117 |
| 4,791,004 | 12/1988 | Suzuki et al. | 427/420 |
| 4,848,268 | 7/1989 | Sollinger et al. | 118/117 |
| 4,929,474 | 5/1990 | Avni et al. | 427/326 |
| 4,973,441 | 11/1990 | Keller | 264/280 |
| 4,978,560 | 12/1990 | Stone | 118/116 |
| 5,010,839 | 4/1991 | Eklund et al. | 118/117 |
| 5,044,305 | 9/1991 | Shibata et al. | 118/DIG. 4 |
| 5,340,611 | 8/1994 | Kustermann et al. | 427/361 |
| 5,378,497 | 1/1995 | Johnson | 427/211 |
| 5,392,701 | 2/1995 | Schiel | 427/366 |

FOREIGN PATENT DOCUMENTS

| | | |
|---|---|---|
| 0 622 127 A1 | 4/1993 | European Pat. Off. . |
| 3438 652 A1 | 10/1984 | Germany . |
| 575 254 | 3/1976 | Sweden . |
| PCT/SE79/00226 | 5/1980 | WIPO . |
| PCT/US94/00350 | 7/1994 | WIPO . |

*Primary Examiner*—Brenda A. Lamb
*Attorney, Agent, or Firm*—Taylor & Aust, P.C.

[57] ABSTRACT

The invention is directed to a method for the application of a liquid or pasty medium onto a traveling fiber material web. The medium is directly applied on at least one side of the traveling material web. The medium is pressed into the traveling material web after the medium is directly applied on the traveling material web.

10 Claims, 6 Drawing Sheets

APPARATUS FOR APPLYING A LIQUID OR PASTY MEDIUM ONTO A TRAVELING MATERIAL WEB

BACKGROUND OF THE INVENTION

1. Field of the Invention

The present invention relates to a method and apparatus for application of a liquid or pasty medium on a traveling material web, notably of paper or cardboard.

2. Description of the Related Art

An apparatus for application of a liquid or pasty medium on a traveling material web working in compliance with a conventional method is known, e.g., from U.S. Pat. No. 4,848,268. In this apparatus, two applicator rolls rotating in opposite directions form between themselves a press nip through which the traveling material web passes. Assigned to each applicator roll is an applicator mechanism which applies the liquid or pasty medium via an applicator pressure chamber and a doctor on the surface of the applicator roll. The medium applied on the applicator roll surface is then carried, due to the rotation of the applicator roll, in the press nip between the two applicator rolls. There, the medium is transferred from the roll surface to the relevant side of the material web and pressed at the same time into the material web. This method of application is called indirect application. With both applicator mechanisms in operation, the traveling material web is in this way coated on both sides with the liquid or pasty medium. In another embodiment of the this prior apparatus, also described in U.S. Pat. No. 4,848,268, the pressure chamber applicators are replaced by such forming a sump with an exposed liquid surface and applying the medium from the sump via a doctor on the surface of the applicator roll.

While good results as such are achieved with this indirect application method and pertaining applicators, contaminations are able to separate out of the paper or cardboard of the material web as the medium is pressed in the material web in the press nip, however, and accumulate on the surface of the applicator rolls. This can happen especially with material webs consisting predominantly of recycled paper. Such contaminations accumulated on the roll surface then soil the applicators and can ultimately striate the application film on the applicator roll surface, which striae will then be visible also on the product, i.e., on the coated material web.

What is needed in the art is a method and apparatus enabling the high-quality application of a liquid or pasty medium on a traveling material web, without contaminations contained in or on the material web being able to degrade the quality of application.

SUMMARY OF THE INVENTION

In the method according to the invention, a liquid or pasty medium is applied on at least one side of the traveling paper web in a direct application.

The liquid or pasty medium applied on at least one side of the material web is then pressed in the traveling material web in a separate step. Hence, the direct application of the medium on the material web and pressing the medium in the material web are separate process steps. Since the pressing step follows the application step in the direction of travel of the material web, any dirt particles or contaminants that may separate from the material web in pressing can no longer proceed to the preceding region of application in which the medium is applied on the material web. The separated particles or contaminants can be removed without difficulty in the region of the separate pressing step, and are thus unable after separation to proceed onto the material web and cause impairments of the quality of application. Besides, separation of dirt particles from the material web in the pressing process is a considerably rarer occurrence in the method according to the invention, since the material web was previously coated already with the liquid or pasty medium. Smaller dirt particles are in this way harmlessly incorporated in the applied medium, thereby reducing dirt particle separations while the medium is pressed in the traveling paper web.

In one embodiment of the method for double-sided application of a liquid or pasty medium on a traveling paper web, the liquid or pasty medium intended for each side of the material web is at the same time applied directly on the traveling material web, and the applied medium is subsequently pressed in the traveling material web on both sides simultaneously. This results in a compact two-step process for double-sided application of a liquid or pasty medium on a traveling material web.

Another embodiment of the inventional method for double-sided application of a liquid or pasty medium on a traveling material web includes the following steps:

To begin with, the liquid or pasty medium is applied directly on one side of the traveling material web. In a following step, the medium applied previously on one side of the material web is separately pressed in the traveling material web. This is followed by a third process step, applying the liquid or pasty medium directly on the other side of the traveling material web. In a following fourth step, the medium applied previously on the other side of the material web is pressed separately in the traveling material web. Thus, the double-sided application of a liquid or pasty medium on a traveling material web occurs in this embodiment in four successive steps performed in the direction of material web passage.

The direct application of a desired final amount of application of liquid or pasty medium on any side of the traveling material web can in the previously described variants of the inventional method suitably be carried out in a single application step. In other words, the medium is preferably applied directly on the material web in a single operation, in a way such that the applied amount matches the desired final amount of application. The result is a compact process.

In a further embodiment of the invention, every step of the direct application of the liquid or pasty medium on any side of the traveling material web is divided in the following partial steps:

A first partial step serves to predose a surplus amount of liquid or pasty medium on the relevant side of the material web. A following separate second step consists in the final dosing of the predosed medium quantity applied previously on the respective side of the material web, to the desired final amount of application.

Instead of a direct application finished-dosed in a single step, the direct application of the medium can thus be subdivided according to the embodiment explained above, as desired in two steps, namely a predosing step and a final dosing step. If desired, both embodiments may also be combined, e.g., to the effect that the direct application of the medium on one side of the traveling material web takes place in a single finish-dosing step, while the direct application of the medium on the other side of the material web occurs in a predosing and a final dosing step. This may be suitable, e.g., when it is desired to apply on the two sides of the material web mediums of different consistency, of which one medium allows easy application in a single finish-dosing step, whereas the other medium can be applied better in separate predosing and finish-dosing steps.

A first inventional apparatus for application of a liquid or pasty medium on a traveling material web, notably of paper or cardboard, includes:

an applicator for direct application of a liquid or pasty medium on one side of the traveling material web, a rotating mating surface carrying the traveling material web along a contact section, and a press roll rotating relative to the mating surface in opposite direction and serving to press liquid or pasty medium applied on one side of the material web into the traveling material web.

The contact section of the material web on the mating surface, based on the travel direction of the material web, has coordinated with it first the applicator and, spaced from it, then the press roll, with press roll and mating surface forming a nip through which the material web is passed while carried on the contact section of the mating surface.

In other words, the traveling material web is supported along a contact section on the surface of the mating face, and along this contact section on the surface an applicator for direct application of the medium is coordinated first with the material web and thereafter a press roll for pressing the medium into the web. Applying the medium and pressing it in are thus spatially separated from one another, and dirt particles which in pressing may separate from the traveling material web proceed only on the surface of the press roll, where they can be removed, for example by means of a suitable cleaning apparatus. But separated dirt particles cannot proceed in the applicator and thereby impair the quality of the application.

An embodiment of the inventional first apparatus for double-sided application of a liquid or pasty medium on a traveling material web includes:

a second mating face rotating in a direction opposite to that of the first mating face and, based on the pass-through direction of the material web, following said mating face at a distance, with the traveling material web being carried on the surface of the second mating face along a contact section in a manner such that the material web side provided already with the medium bears on the surface, a second applicator for direct application of a liquid or pasty medium on one side of a traveling material web, and a second press roll rotating in a direction opposite to that of the second mating face and serving to press liquid or pasty medium applied on one side of the traveling material web into the traveling material web.

Coordinated with the contact section of the material web on the surface of the second mating face, relative to the pass-through direction of the material, is first the second applicator and thereafter, at a distance, the second press roll, with the second press roll forming with the second mating face a press nip through which the material web is carried while bearing on the contact section of the second mating face.

In other words, the first inventional apparatus for coating one side of the traveling material web is in this embodiment of the invention followed by an identical apparatus for coating the other side of the traveling material web. This results in two mating faces rotating in mutually opposite directions and carrying the traveling material web first on its one side and then on its other. Coordinated with each mating face, in pass-through direction of the material web, is first an applicator and then a press roll.

A second inventional apparatus for application of a liquid or pasty medium on a traveling material web, notably of paper or cardboard, includes:

an applicator for direct application of a liquid or pasty medium on one side of the traveling material web, a rotating mating face on the surface of which the traveling material web is carried along a contact section, a press roll rotating in a direction opposite to that of the mating face and serving to press liquid or pasty medium applied on one side of the material web into the traveling web, and a press roll mating roll rotating in a direction opposite to that of the press roll.

The applicator is coordinated with the contact section of the material web on the surface of the mating face, while the press roll, based on the pass-through direction of the material web, is coordinated with the side of the material web provided previously with medium by the applicator, at a distance after the mating face, and forms with the press roll mating roll a press nip through which the traveling material web is passed.

In other words, the applicator is in this second inventional apparatus coordinated with the mating face, and the press roll has assigned to it a mating roll of its own, whereas in the previously illustrated first apparatus according to the invention the applicator and the press roll were coordinated with a common mating face.

A favorable embodiment of a second inventional apparatus for double-sided application of a liquid or pasty medium on a traveling material web includes:

a second mating face rotating relative to the first press roll in the same direction and following said mating face at a distance, based on the pass-through direction of the material web, with the traveling material web being carried on the surface of the second mating face along a contact section in a manner such that the side of the material web provided already with the medium bears on the roll surface, a second applicator for direct application of a liquid or pasty medium on one side of a traveling material web, a second press roll rotating relative to the second mating face in opposite direction and serving to press liquid or pasty medium applied on one side of the material web in the traveling material web, and a second press roll mating roll rotating in a direction opposite to that of the second press roll.

The second applicator is coordinated with the contact section of the material web on the surface of the second mating face, and the second press roll is coordinated, spaced behind the second mating face, based on the pass-through direction of the material web, with the side of the material web provided previously with the medium by the second applicator, and it forms with the second press roll mating roll a press nip through which the traveling material web is passed.

In other words, the second inventional apparatus for coating one side of the traveling material web is in this embodiment followed by an identical apparatus for coating the other side of the traveling material web. Each applicator has assigned to it a mating face of its own, and each press roll a mating roll of its own.

In the inventional apparatus illustrated above, the rotating mating faces are fashioned preferably as rotating mating rolls. But the rotating mating faces may as well be fashioned as revolving endless belts. Such revolving endless belts are then carried across pertaining drive rolls, reversing rolls, idler rolls and/or sliding shoes or press shoes.

A third inventional apparatus for double-sided application of a liquid or pasty medium on a traveling material web, notably of paper or cardboard, includes:

two applicators (which may be of the same type) each of which applies a liquid or pasty medium directly on one of the two sides of the traveling material web, and two press rolls of same type that rotate in opposite directions and each of which presses the liquid or pasty medium applied on the relevant one of the two sides of the material web into the traveling material web.

The two applicators oppose one another and are coordinated each with one side of the traveling material web in a manner such that the material web passes through between the two applicators. Furthermore, based on the pass-through direction of the material web, the two press rolls are arranged at a distance after the two applicators, in a fashion such that the two press rolls form between them a press nip through which the traveling material web passes, with the running directions of the two press rolls corresponding in the press nip with the pass-through direction of the material web.

Hence, the third inventional apparatus applies first a coat of liquid or pasty medium directly on both sides of the material web, in that the web is passed through between the two applicators, while the previously applied medium is then on both sides pressed in the material web by passing the web between two press rolls that rotate in a direction corresponding to that of the material web passage.

In the third inventional apparatus illustrated above, the pass-through direction of the material web, based on a horizontal plane, is in a favorable embodiment from bottom to top. Preferably, the material web passes through between the two applicators and the two press rolls in a common plane.

In one embodiment of the inventional apparatus illustrated above, the applicators are fashioned as doctor/pressure chamber applicators. The doctors are preferably designed as profiled doctor bars, smooth doctor bars or doctor blades. Using profiled doctor bars is favorable insofar as the medium to be applied is dosed volumetrically, that is, the amount of medium applied is virtually independent of the machine speed. Thus, the desired amount of liquid or pasty medium can be applied very reliably.

In a further embodiment of the inventional apparatus, the applicators may be designed as such featuring open-jet nozzles.

A favorable embodiment of the third inventional apparatus illustrated above is constituted by fashioning the applicators as doctor applicators forming a sump of the medium being applied with an exposed liquid surface. The pertaining pass-through direction of the material web through the two sump applicators is then from top to bottom, based on a horizontal plane. The doctors of the sump applicators are preferably designed as profiled doctor bars, smooth doctor bars or doctor blades.

One embodiment of the inventional apparatus consists in subdividing the applicators in a predosing apparatus for direct application of a surplus of liquid or pasty medium on one side of the traveling material web and a following separate final dosing apparatus serving to dose the amount of medium applied on the material web to the desired, final quantity. The predosing apparatus may be designed then as doctor/pressure chamber applicators, doctor/sump applicators, open-jet nozzle applicators or in comparable manner. The final dosing apparatus may be configured as doctor-blade final dosing apparatus or comparably.

Preferably, however, the applicators in the inventional apparatus are designed as finish-dosing applicators, that is, they allow applying a desired final amount of medium directly on the material web without requiring any finish dosing. The doctor/pressure chamber applicators or doctor/sump applicators explained above already are preferably used for that purpose.

A fourth inventional apparatus for application of a liquid or pasty medium on a traveling material web, notably of paper or cardboard, includes:

an open-jet nozzle applicator for direct application of a liquid or pasty medium on one side of a traveling material web, a rotating press roll for pressing liquid or pasty medium applied on one side of the material web into the traveling material web, and a press roll mating roll that rotates in a direction opposite to that of the press roll.

The open-jet applicator is coordinated with the top side of an unsupported section of the material web that extends substantially horizontally, while the press roll, based on the pass-through direction of the material web, is at a distance behind the open-jet applicator coordinated with the material web side coated with the medium previously and forms together with the mating roll a press nip through which the traveling material web is passed. The running direction of the press roll in the press nip corresponds to the pass-through direction of the material web.

Hence, a rotating mating face is dispensed with in the fourth inventional apparatus, that is, the applicator does not require a mating roll or a coordinated endless belt. The direct application of the liquid or pasty medium takes place along a substantially horizontally extending open draw of the material web. Viewed in the pass-through direction of the material web, before the position of the applicator, the arrangement of a reversing roll for instance is sufficient to deflect the material web in the substantially horizontal direction of travel.

The open-jet applicator in the fourth inventional apparatus is preferably configured as an applicator after the principle of a waterfall. In such applicator, the liquid or pasty medium to be applied flows in the fashion of a waterfall from the applicator, in an appropriately dosed amount, onto the material web that passes by beneath the applicator. The top side of the material web is in this way coated with the medium.

An advantage of the inventional apparatus is that providing press rolls separately allows adapting the material selection and surface properties of the press roll surface optimally to the requirements as regards a sound pressing process. In prior apparatus, where the liquid or pasty medium is applied first on the surface of an applicator roll and then transferred onto the traveling material web in a press nip (indirect application), the selection of applicator roll material and surface properties is governed primarily by the sound application of the medium on the roll surface, that is, by sound wetting of the surface. However, the material selection and the surface properties of the applicator roll cannot to an equal extent be adapted to the pressing function of the applicator roll in the applicator roll nip. With the application of the medium taking place inventionally now in a separate preceding step, directly onto the material web, and pressing the medium into the material web being carried out as a separate step of its own, the press rolls can with respect to their engineering and material-related configuration be adapted optimally to the pressing function.

In favorable embodiments, at least the surfaces of the press rolls are made of steel, rubber or polyurethane. In this context it may be favorable to provide the surfaces of the press rolls additionally with an antistick cover characterized by a comparatively low coefficient of friction. Such antistick cover consists preferably of a material on the basis of polytetrafluoroethylene (PTFE). Such Teflon coating counteracts sticking of the applied medium to the press rolls. Depending on their intended use, the press rolls may be provided with a maximally smooth, hard surface or with a soft surface having properties such that the applied medium will virtually not stick to it.

The peripheral speed of the press roll surface matches preferably the speed of travel of the material web in the press nip. Hence, there is no relative speed given between press roll surface and material web, so that the paper is practically not being stressed.

In one embodiment, the press rolls are equipped with a heating device that heats at least the roll surface, thereby accelerating the drying of the applied medium on the material web.

In another embodiment, a cleaning apparatus is coordinated with each press roll along a peripheral section of the roll surface. The cleaning apparatus features in a favorable embodiment a scraper blade which removes from the roll surface the dirt particles that separated from the material in the press nip. In conjunction with a coordinated cleaning apparatus it is favorable for the press roll surface to consist of a hard material, so that the surface quality of the press roll will not be impaired by the scraper blade or by accumulated dirt particles.

The inventional method and inventional apparatus serve especially the sizing of material webs, but just as well the application of most varied liquid or pasty coating mediums, sizing with pigments, starch, impregnating solution and the like. In the inventional method and inventional apparatus, the liquid or pasty medium is always applied directly on the material web, that is, without an intervening applicator roll, and the applied medium is always pressed into the material web separately from the process of applying the medium on the material web. Any contaminants or dirt particles which during pressing may separate from the traveling material web are in this way prevented from proceeding to the applicator and degrading the application quality of the medium on the traveling material web.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
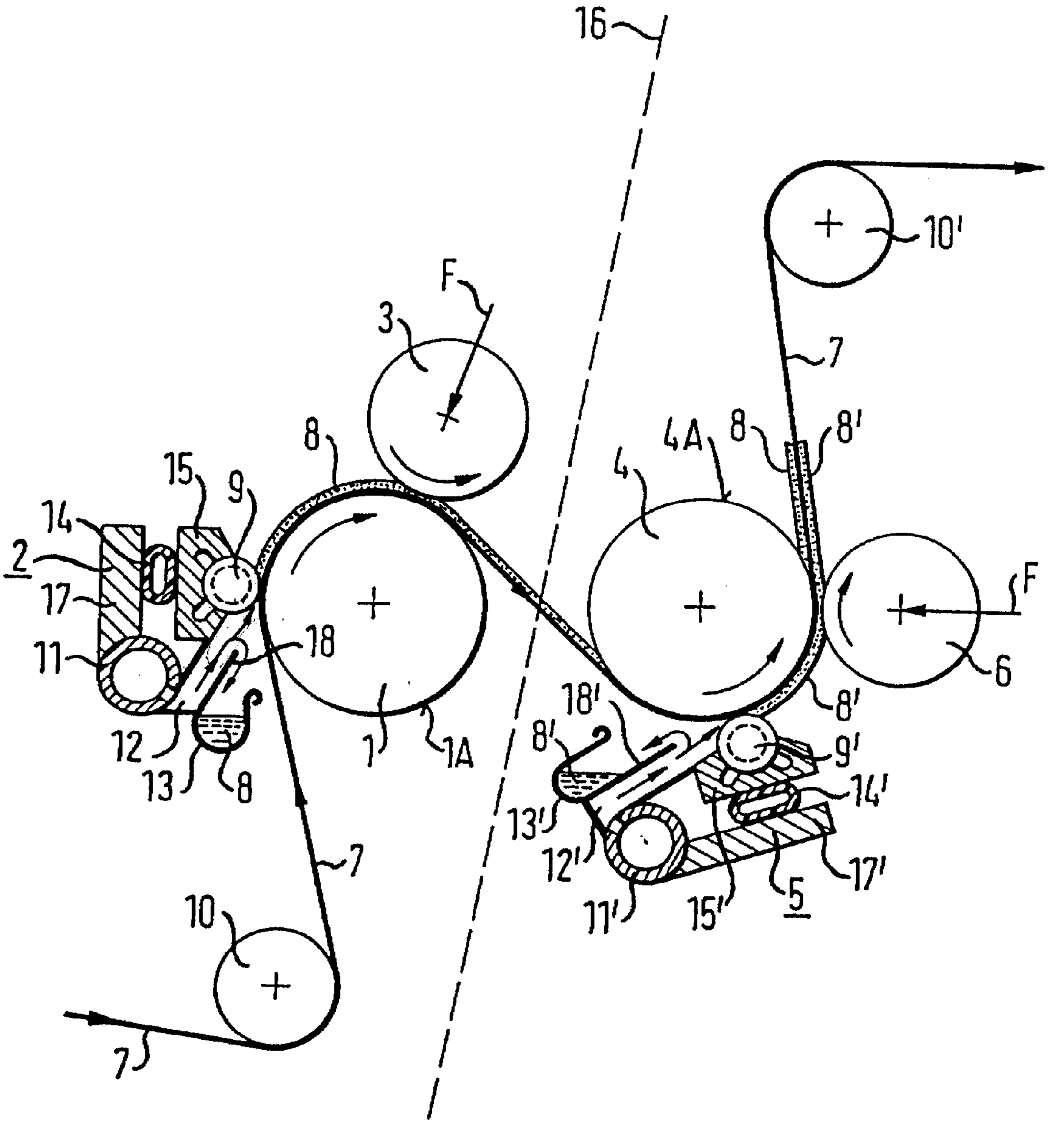
FIG. 1 is a first exemplary embodiment of the inventional apparatus in a schematic cross-sectional view.

FIG. 1 shows a first exemplary embodiment of the inventional device. A traveling material web, for example of paper or cardboard, is first carried across a reversing roll 10. The direction of travel of material web 7 is indicated by arrows alongside the material web. The material web 7 proceeds then over a mating roll 1 rotating in the direction of the arrow. Material web 7 bears on the roll surface 1A of mating roll 1 along a contact section and is in this way backed by the mating roll during passage. Next, the material web 7 proceeds to a second mating roll 4 rotating in the direction of the arrow, on the roll surface 4A of which the material web bears along a contact section and is backed in this way during passage. Thereafter, material web 7 runs over a reversing roll 10' and on to further processing.

Along its path just described, the material web 7 is coordinated with, in the area in which it is carried by the mating roll 1, first an applicator 2. At a distance thereafter, in the direction of travel, a press roll 3 is coordinated with the material web 7 as well, still in the region in which it is carried by the mating roll 1. Following the pass-through direction of the material web further, a second applicator 5 is coordinated with the material web 7 in the region in which it is carried by the second mating roll 4. At a distance thereafter in the direction of travel and still in the region in which it is carried by the mating roll 4, the material web is coordinated with a second press roll 6.

The two applicators 2 and 5 are doctor element/pressure chamber applicators of identical type, for which reason both applicators—each illustrated only in simplified manner—are described hereinafter jointly as to their structure and mode of operation. Applicators 2, 5 comprise a support beam 17, 17' which supports the further attached components. The liquid or pasty medium 8, 8' to be applied is fed through a color manifold 11, 11' to a feed gap 12, 12'. The medium to be applied is fed in the direction of the arrow under pressure to an applicator chamber fashioned between a doctor element 9, 9' and a bounding wall 18, 18'. Doctor element 9, 9' is in this example a profiled doctor bar mounted in a doctor bed 15, 15' in a manner rotatable about its longitudinal axis. The dashed line in the illustration of the doctor bar 9, 9' indicates transverse grooves fashioned across the length of the doctor bar and defining its profile. The pressurized medium 8, 8' is applied from the applicator chamber via the doctor element 9, 9' uniformly on the material web 7, with the doctor bar 9, 9' normally being driven so as to rotate in a direction opposite to that of mating roll 1, 4.

The profiling of doctor bar 9, 9', i.e., the transverse grooves which in the example are arranged across its longitudinal expanse, enable a volumetric dosing of the applied amount of medium. That is, the desired final application amount of the medium can be applied directly on the material web 7. Since the applicator applies the liquid or pasty medium directly on the material web 7, this is a so-called direct application. On the applicator chamber side away from the doctor bar 9, 9', surplus pressurized medium is able to drain between bounding wall 18, 18' and mating roll 1, 4 into collecting tub 13, 13'. A pressure hose 14, 14' is provided to force doctor bar 9, 9' with the desired contact force onto mating roll 1, 4.

The two press rolls 3, 6 are in the present example as well of the same type and, therefore, are described jointly hereinafter. Each press roll 3, 6 forms with its pertaining mating roll 1, 4 a press nip. The material web 7 carried on the surface of mating roll 1, 4 passes through the press nip. Press roll 3, 6 is with a desired contact force F pressed radially onto the surface of mating roll 1, 4, with press roll 3, 6 being driven so as to rotate in the direction of the arrow. The travel speeds of the surface of press roll 3, 6 and mating roll 1, 4 are identical; that is, there is no relative movement engendered in the press nip, of press roll 3, 6 relative to material web 7 carried on mating roll 1,4.

The following describes the function of the first exemplary embodiment of the inventional apparatus:

Material web 7 passes on the surface of the first mating roll 1 through the first applicator 2. There, the material web side near the applicator 2 is coated, e.g., with a desired final amount of liquid or pasty medium 8. Coated in this way on one side, material web 7 passes then press roll 3, which presses the previously applied medium 8 in the material web 7. Next, material web 7 is passed across the second mating roll 4 in a way such that the already coated side contacts the mating roll while the still uncoated side of material web 7 faces the second applicator 5. This side is now coated by applicator 5, for example with a desired final amount of medium 8'. Thereafter, material web 7 proceeds across the second press roll 6, which presses the previously applied medium 8' in the material web 7. Next, material web 7, now coated on both sides with medium 8, 8', proceeds to a further processing step (not shown).

Depending on needs, the same medium may be applied on both sides of the material web, or the applied mediums 8, 8' may differ in consistency. Also, the final amounts applied on both sides may be equal or different amounts may be chosen for both sides.

The apparatus illustrated in FIG. 1 serves the double-sided application of liquid or pasty medium on a traveling material web. When using only one half of this apparatus, i.e., either the half illustrated left of the dashed line 16 or the one to the right of the dashed line 16 in FIG. 1, an exemplary embodiment of the inventional apparatus is obtained that is suited for the application of a medium on only one side of the traveling material web.

Figure 2:
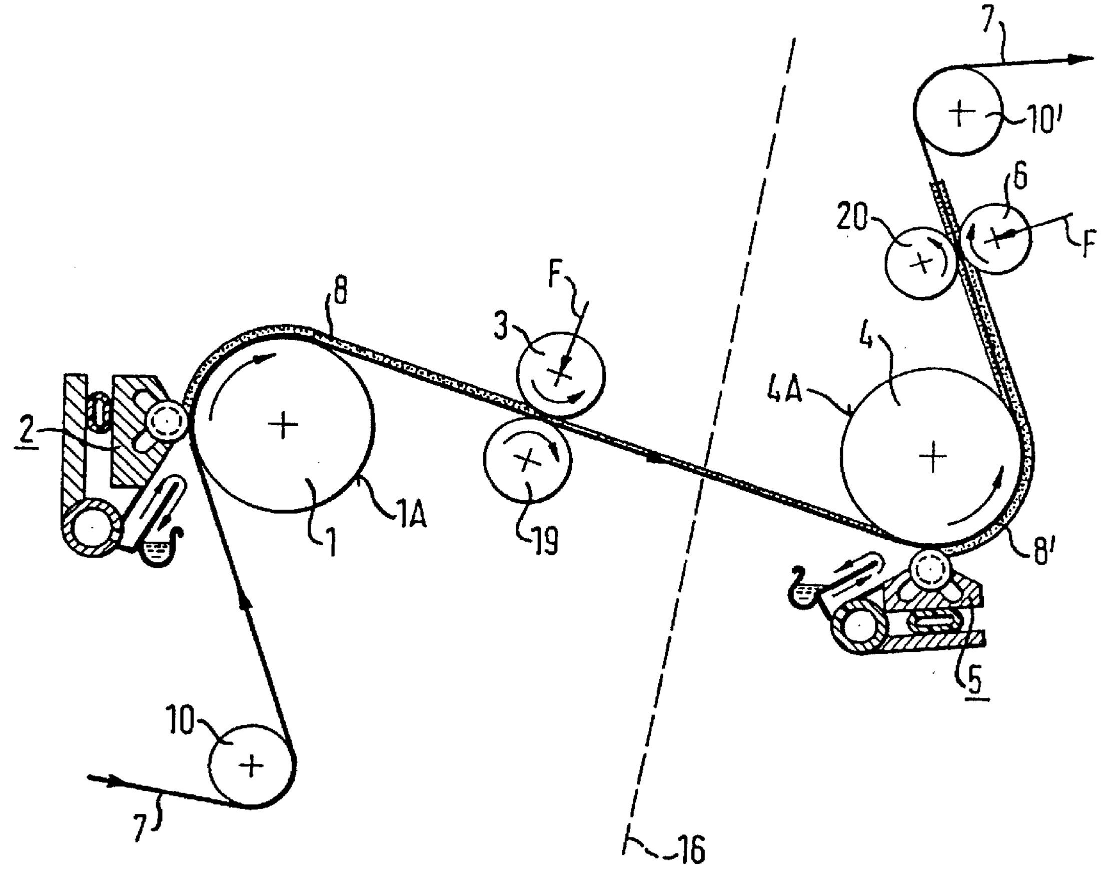
FIG. 2 is a second exemplary embodiment of the inventional apparatus in a schematic cross-sectional view.

In the second exemplary embodiment of the inventional apparatus as illustrated in FIG. 2, identical or corresponding components are referenced identically, as in the first exemplary embodiment relative to FIG. 1. Regarding details of these components, reference is thus made to the preceding explanations.

A traveling material web 7 negotiates a reversing roll 10 and proceeds then along a contact section around roll surface 1A of a mating roll 1. In the region of this contact section of material web 7 on mating roll 1, an applicator 2 is coordinated with the material web. Mating roll 1 is driven so as to rotate in the direction of the arrow and carries the material web 7 on through a press nip arranged at a distance after mating roll 1. Said press nip forms between press roll 3 and press roll mating roll 19. Press roll 3 and press roll mating roll 19 rotate in opposite directions as indicated by arrows and are driven such that the travel speeds of the surfaces of both rolls 3 and 19 match the pass-through speed of material web 7 in the nip, thereby avoiding relative movements between the roll surfaces and the material web. Next, material web 7 proceeds over a second mating roll 4 in a way such that the material web side which previously, on the first mating roll 1, was on the outside is now carried along a contact section of roll surface 4A of the second mating roll 4. In the region in which the material web is carried by mating roll 4, a second applicator 5 is coordinated with it. The second mating roll 4 is driven so as to rotate in the direction of the arrow and carries the material web on to a second press nip formed between a second press roll 6 and a second press roll mating roll 20. The two rolls 6 and 20 rotate oppositely in the direction of the arrow and are driven such that the travel speeds of their roll surfaces in the nip match the pass-through speed of the material web. Next, the material web proceeds over a reversing roll 10'.

The following describes the function of the second exemplary embodiment of the inventional apparatus:

As material web 7 passes the first applicator 2, the material web side near the applicator is coated directly with a liquid or pasty medium 8. The medium 8 may be applied immediately in a desired final amount. The applied medium 8 is in the press nip between press roll 3 and press roll mating roll 19 pressed into the material web, with press roll 3 being forced with a desired force F, radially, onto press roll mating roll 19. Next, applicator 5 applies directly on the other side of the material web a liquid or pasty medium 8'. The amount applied may as well be, immediately, a desired final amount. As the second nip is being passed, the previously applied medium 8' is pressed in the material web, with the second press roll 6 being forced with a desired contact force F, radially, onto the second press roll mating roll 20.

The various components, such as applicators 2, 5, mating rolls 1, 4 and press rolls 3, 6 correspond in their design in the present example with the previously described first exemplary embodiment relative to FIG. 1. Additionally provided are now two press roll mating rolls 19, 20. Unlike in the first exemplary embodiment relative to FIG. 1, press rolls 3, 6 form in the second exemplary embodiment the press nip not with the mating rolls 1, 4, but with these additional press roll mating rolls 19, 20.

Using again only one half on either side of the dashed line 16 in FIG. 2, a further exemplary embodiment of the inventional apparatus is obtained, for application of liquid or pasty medium on only one side of the traveling material web.

Figure 3:
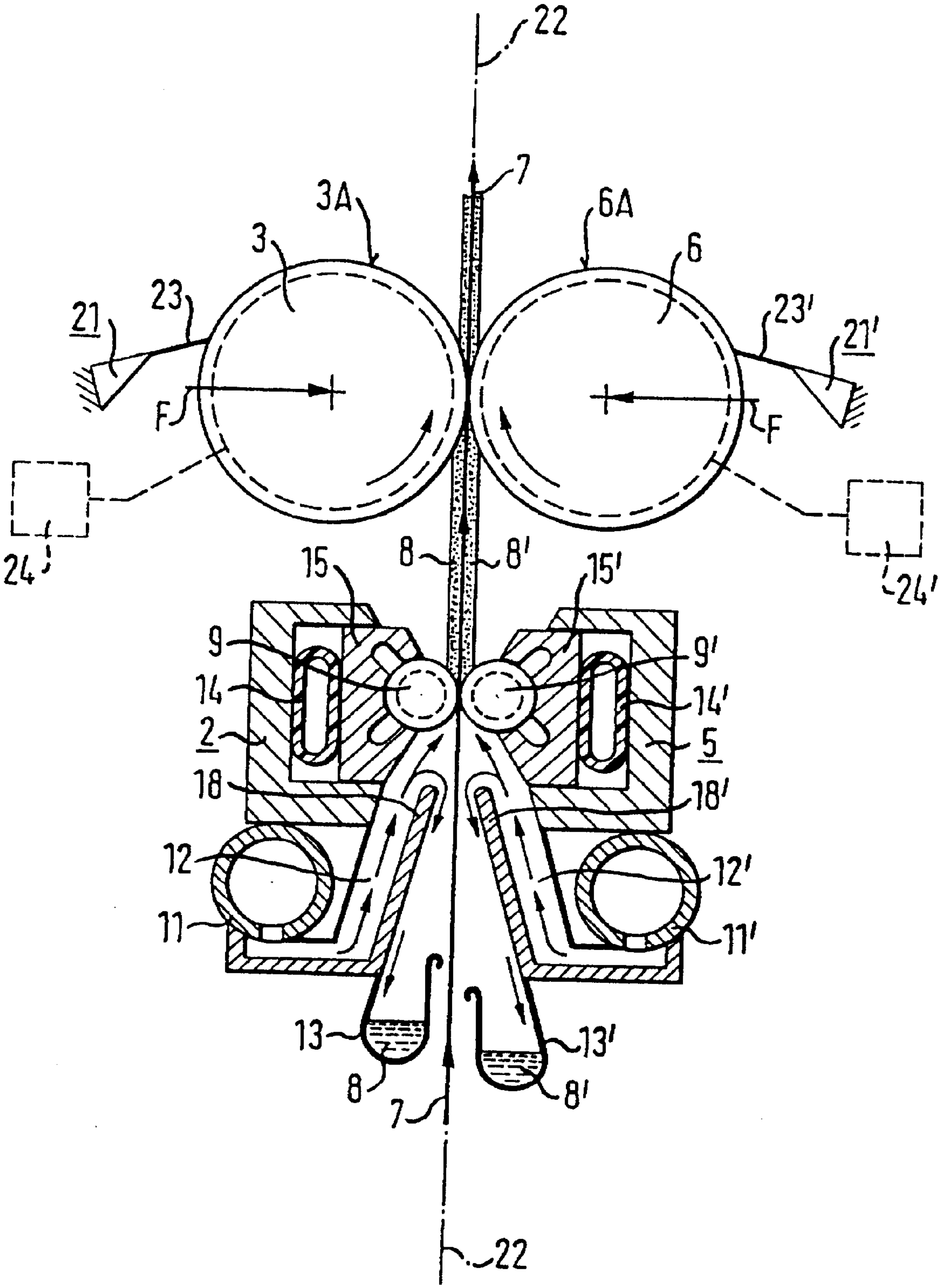
FIG. 3 is a third exemplary embodiment of the inventional apparatus in a schematic cross-sectional view.

Illustrated in FIG. 3, the third exemplary embodiment of the inventional apparatus also has identical or corresponding components as in the first exemplary embodiment in FIG. 1 referenced identically, and reference is made to the description given there.

In the third exemplary embodiment, two doctor element/pressure chamber applicators 2, 5 oppose each other, forming between them a nip through which passes the traveling material web 7. Arranged oppositely at a distance thereafter in the travel direction of material web 7 are two press rolls 3, 6, forming between them a press nip through which passes the material web 7. Material web 7 is being carried such that its direction of travel, based on a horizontal plane in FIG. 3, is from bottom to top. The traveling material web 7 passes along a common pass-through plane 22, which in FIG. 3 is indicated by dashed line, both through the two applicators 2, 5 and the two press rolls 3, 6. This results in a simple web travel without directional change in the region of the application and pressing processes.

In addition to their respective function of applying liquid or pasty medium 8, 8', the doctor bars 9, 9' of the two applicators 2, 5 constitute a mating support for the relevant other doctor bar. Its two doctor bars 9, 9' being forced onto one another, this arrangement requires therefore no mating rolls, which otherwise assume the mating function in the direct application on the material web.

The two press rolls 3, 6 bear as well on one another, being forced together with a desired contact force F. The travel speeds of the surfaces of both press rolls 3, 6 match the pass-through speed of the material web in the nip. Coordinated with each roll surface 3A, 6A is a cleaning apparatus 21, 21', illustrated merely schematically. Each cleaning apparatus features a scraping blade 23, 23' that removes from roll surfaces 3A, 6A any contaminants or dirt particles which during the pressing in the nip may separate from the material web 7, thus preventing contaminants or dirt particles from being carried again by press rolls 3, 6 on the already coated material web. Such or similar cleaning apparatus are suitably provided also on press rolls 3, 6 of the previously described first and second inventional exemplary embodiments.

Schematically indicated by dashed lines are heating devices 24, 24', of which one each is coordinated with each of the press rolls 3, 6. In the case of each of the press rolls 3, 6 driven so as to rotate in the direction of the arrow, the region between the dashed circle line and roll surface 3A, 6A is heated in the present example. This promotes the drying of the liquid or pasty medium 8, 8' applied previously on both sides as the medium 8, 8' makes contact with the heated roll surfaces 3A, 6A. The schematically illustrated heating devices 24, 24', e.g., may be electric heating devices or such in which a circulation of heated, for example liquid medium is being maintained. Other suitable heating devices may be employed as well. Also in the previously described first and second exemplary embodiments relative to FIG. 1 and 2, the press rolls 3, 6 may be equipped with heating devices.

In the third exemplary embodiment illustrated in FIG. 3, the traveling material web 7 passes first the two applicators 2, 5. In the process, a desired final amount of liquid or pasty medium 8, 8' may be applied simultaneously on each side of the traveling material web 7. The medium is again applied directly on the material web, and both the amount of application and consistency of the medium 8, 8' may be chosen differently for the two sides of the material web. Coated on both sides, the material web 7 proceeds then through the nip between press rolls 3, 6, the previously applied medium 8, 8' being pressed from both sides in the material web 7. The heated roll surfaces 3A, 6A additionally promote the drying of the medium in the material web.

Figure 4:
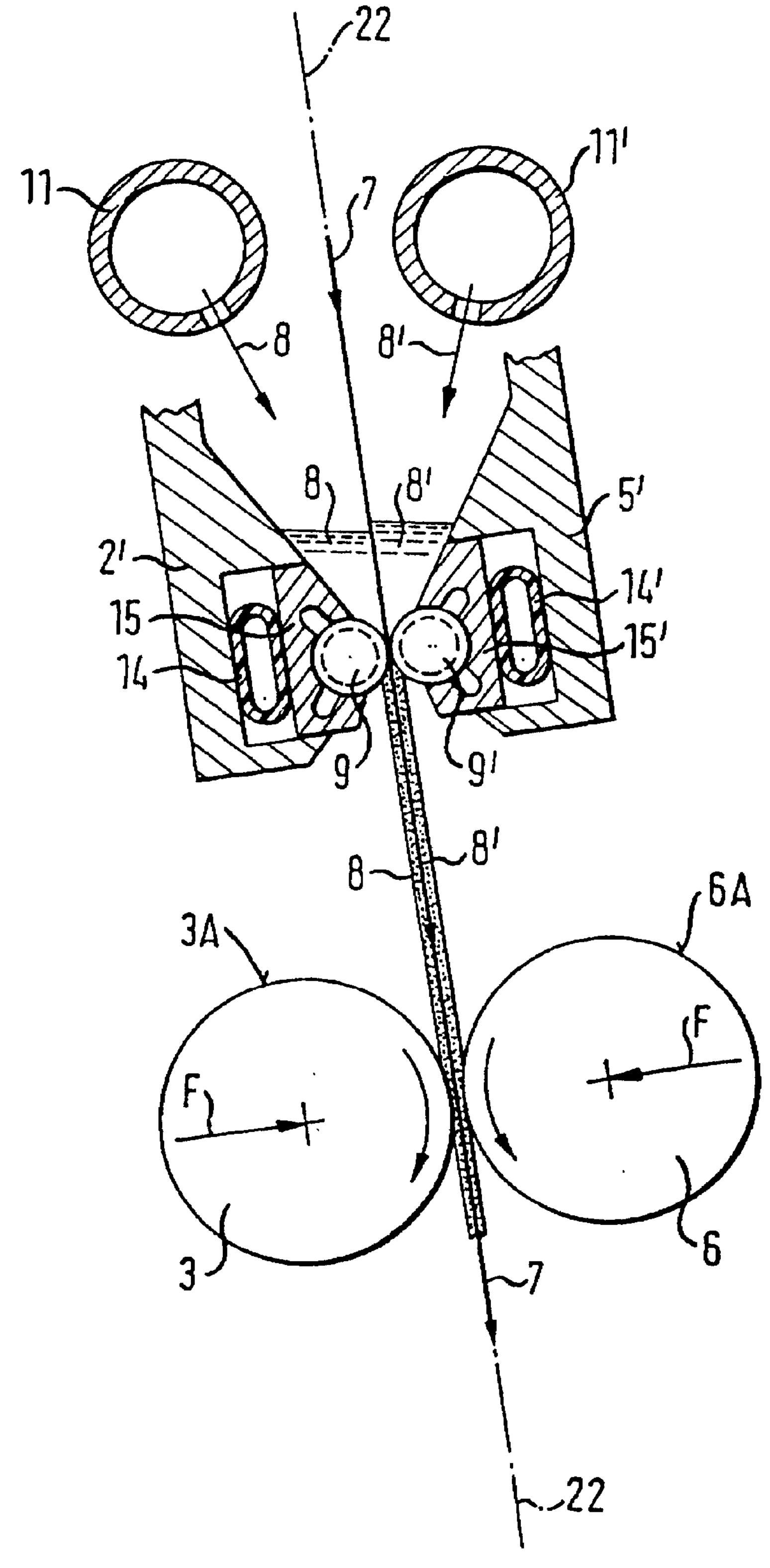
FIG. 4 is a fourth exemplary embodiment of the inventional apparatus in a schematic cross-sectional view.

Illustrated in FIG. 4 is a fourth exemplary embodiment of the inventional apparatus, which in its basic structure resembles the third exemplary embodiment relative to FIG. 3. Regarding the arrangement and function of press rolls 3, 6, therefore, reference is made to the above explanations. Cleaning apparatus 21, 21' and heating devices 24, 24', which in the fourth exemplary embodiment may be present as well, have been omitted for reasons of clarity. In the fourth exemplary embodiment too, the traveling material web passes in a common plane 22 both through two opposing applicators and two opposing press rolls 3, 6. Based on a horizontal plane in FIG. 4, the pass-through direction of material web 7 is from top to bottom.

The two opposing applicators 2', 5' are in the present exemplary embodiment fashioned as doctor element/sump applicators. Identical or corresponding components of said applicators are referenced identically as in the previously explained doctor element/pressure chamber applicators 2, 5. Regarding these components, reference is made to the preceding explanations.

The liquid or pasty medium 8, 8' to be applied flows from the color manifolds 11, 11' to a sump with exposed liquid level. From the sump, the liquid or pasty medium 8, 8' is under the force of gravity applied via the profiled doctor bars 9, 9' on the respective side of material web 7. The amount of medium applied may be the desired, final amount of application. Again, the applied amount and consistency of the medium 8, 8' may be chosen differently for both sides of the material web. The application occurs on both sides directly on the material web.

Material web 7 passes the two opposing applicators 2', 5', passing first through the two sumps and then the two doctor bars 9, 9'. The medium 8, 8' applied on both sides is then pressed into the material web in the nip between the two press rolls 3, 6.

Figure 5:
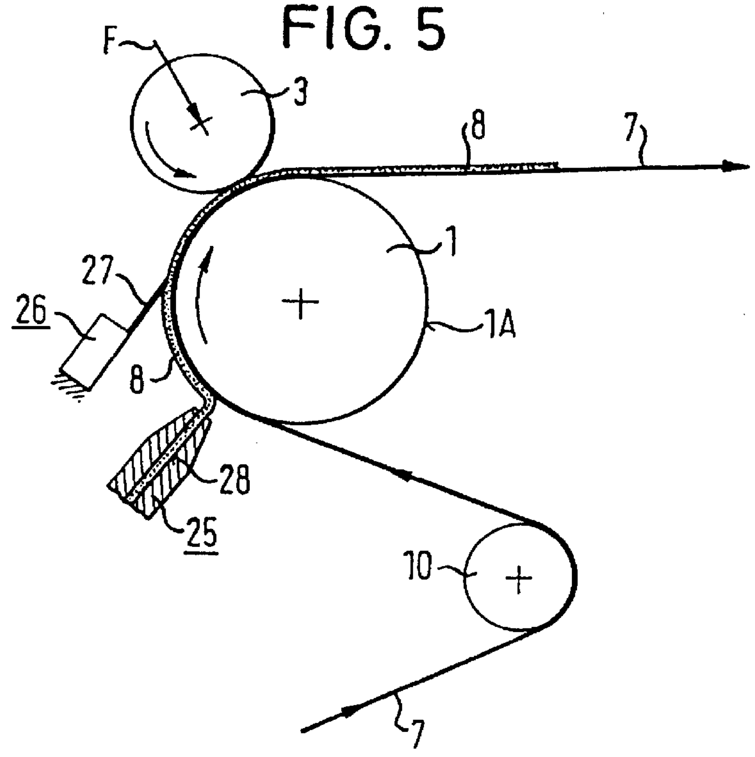
FIG. 5 is a fifth exemplary embodiment of the inventional apparatus in a schematic cross-sectional view.

Shown in FIG. 5, the fifth exemplary embodiment of the inventional apparatus, aside from the applicator, corresponds with the exemplary embodiment illustrated in FIG. 1 on the left of dashed line 16. Therefore, reference is made to the explanations given there, describing hereinafter only the differing structure of the applicator.

The applicator is subdivided in a predosing apparatus 25 and finish-dosing apparatus 26, each illustrated only schematically. Predosing apparatus 25 is in the present exemplary embodiment configured as an open-jet nozzle applicator applying through a feed gap 28 liquid or pasty medium directly on the respective side of the traveling material web 7. The medium application takes place in a free stream, and at that, in a quantity greater than the desired final amount. The finish-dosing apparatus 26 doses the surplus amount in the present example by way of a doctor blade 27 down to the desired final amount, by scraping off the excess of applied medium 8. While in this exemplary embodiment the applicator is divided in partial apparatus of which the finish-dosing apparatus 26 follows the predosing apparatus 25 along the contact section of the material web on mating roll 1, the separation of medium application and pressing the medium in the material has also been maintained in this exemplary embodiment.

Figure 6:
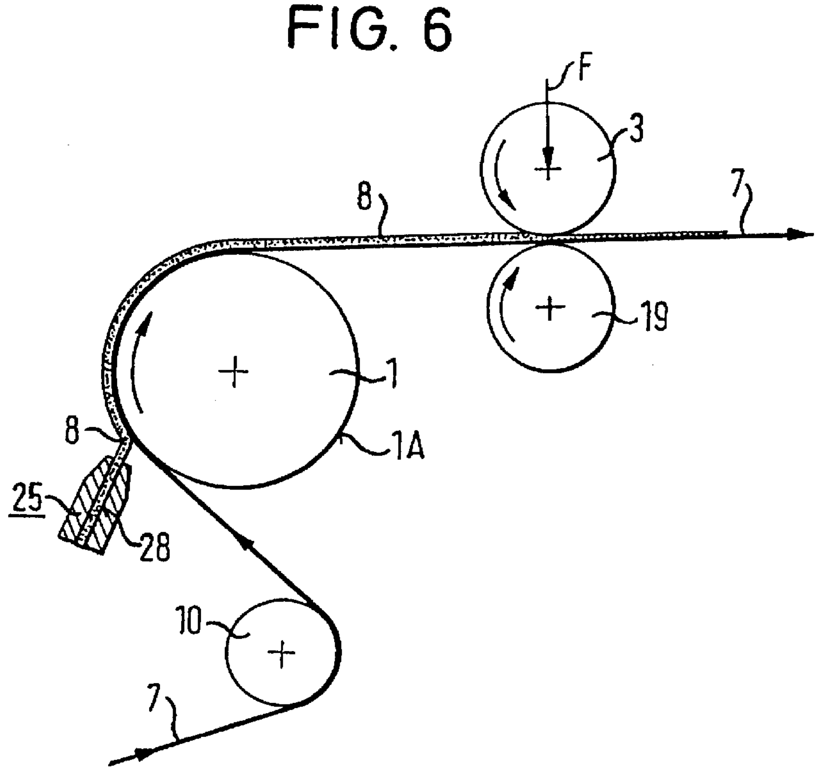
FIG. 6 is a sixth exemplary embodiment of the inventional apparatus in a schematic cross-sectional view.

Shown in FIG. 6, the sixth exemplary embodiment of the inventional apparatus corresponds in its basic structure with the exemplary embodiment shown in FIG. 2 to the left of the dashed line 16. As to corresponding components, reference is made therefore to the explanations given there. Differing from the fifth exemplary embodiment in FIG. 5, the sixth exemplary embodiment has the open-jet nozzle applicator not followed by a finish-dosing apparatus, but the open-jet nozzle applicator 25 applies the desired final amount of liquid or pasty medium 8 directly. Regarding the basic structure, function and coordination of open-jet nozzle applicator 25, reference is made to the above descriptions in conjunction with FIG. 5. Hence, an additional doctor element such as provided in the fifth exemplary embodiment in the form of a doctor blade 27 is avoided in the sixth exemplary embodiment relative to FIG. 6. Avoided thereby are also disturbances on such doctor element that might occur due to dirt on the doctor element.

Both in the fifth and also sixth exemplary embodiment an identical apparatus each may follow for coating the other side of the material web.

Figure 7:
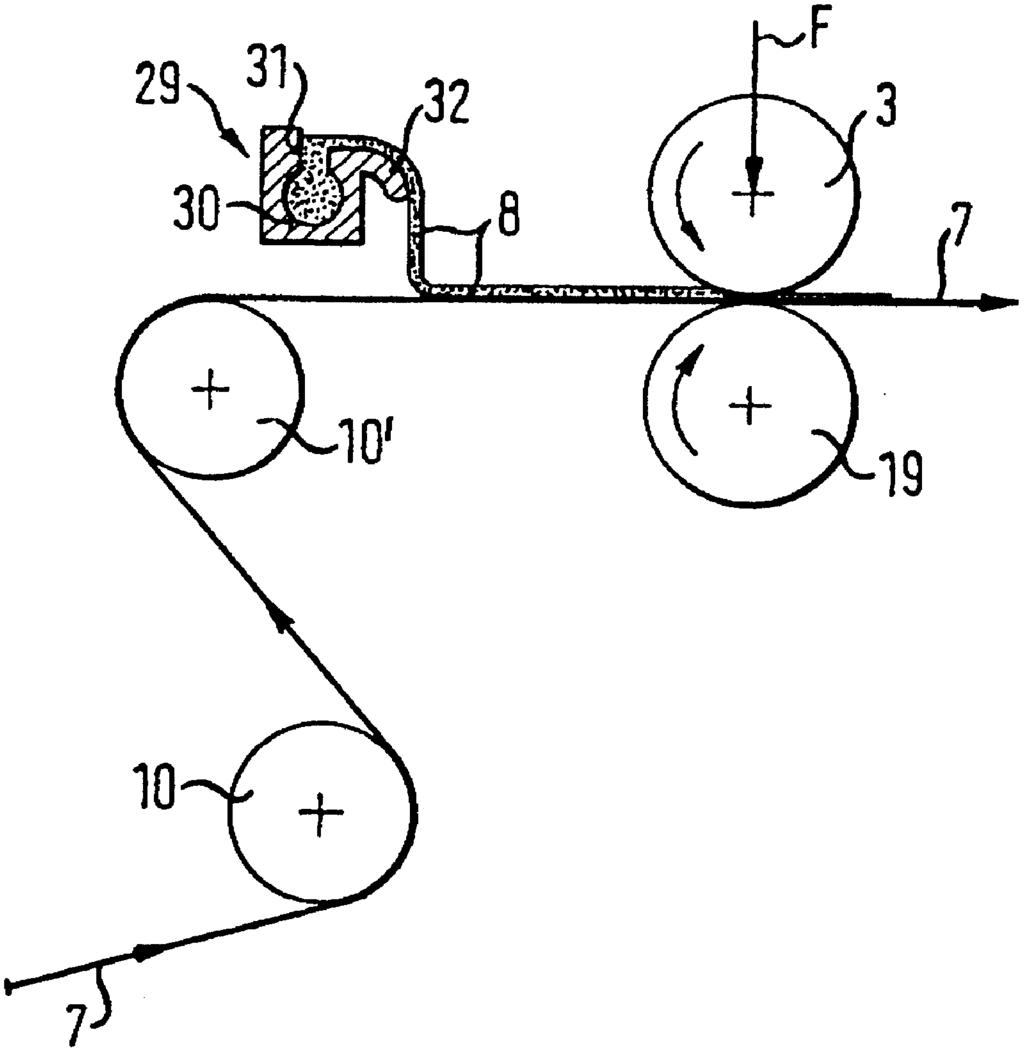
FIG. 7 is a seventh exemplary embodiment of the inventional apparatus in a schematic cross-sectional view.

In the seventh exemplary embodiment of the inventional apparatus, shown in FIG. 7, no mating roll is coordinated with the applicator. Regarding corresponding components and notably corresponding the structure, function and arrangement of press roll 3 and press roll mating roll 19, reference is made to the explanations given in conjunction with the preceding exemplary embodiments.

Guide rolls, or reversing rolls, 10, 10' carry the traveling material web 7 into a substantially horizontal direction of travel. Viewed in the pass-through direction of the material web, an open-jet applicator 29 is coordinated with the top side of material web 7 behind the guide or reversing roll 10'. The material is unsupported in this region of application, proceeds in open draw between the guide or reversing roll 10' and the following press roll assembly 3, 19. Open-jet applicator 29 includes a color manifold 30 which via a feed gap 31 connects to an overflow surface 32. The medium 8 to be applied proceeds from the color manifold 30 via feed gap 31 onto overflow surface 32 and flows then in free fall onto the material web passing beneath. Additional (not shown) control organs may be provided on open-jet applicator 29 for dosing to the desired quantity the amount of coating medium film 8 flowing in waterfall fashion from the overflow surface 32. Also called a "curtain coater," such an applicator realizes a noncontact direct application of the medium. As a result, the applicator is not affected by any dirt contained on the material web.

Of course, the individual exemplary embodiments may be combined among one another in various ways, if needed. For example, the apparatus for coating one side of the material web 7 as shown in FIG. 5 can be combined with the apparatus for coating the other side of the material web illustrated in FIG. 2 to the right of dashed line 16. Or the apparatus shown on the left side of dashed line 16 in FIG. 1, for coating the one side of material web 7, can be combined with the apparatus for coating the other side of the material web, as shown on the right-hand side of dashed line 16 in FIG. 2.

As needed, naturally, it is also possible to provide before reaching the second applicator 5 a drying device for the side of material web 7 coated already with the medium 8.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for application of a liquid or pasty medium onto a traveling fiber material web having two sides and a direction of travel, said apparatus comprising:

a first applicator for direct application of the medium onto a first side of the traveling material web, said first applicator comprising a predosing apparatus for directly applying a surplus amount of the medium on a corresponding said first side of the travelling material web and a finish-dosing apparatus for dosing said directly applied amount of the medium to a desired final amount of application;

a first rotating press roll for pressing the medium applied by said first applicator into the traveling material web, said first press roll being positioned after said first applicator in the direction of travel;

a first rotating mating face having a surface with a first contact section, said first applicator being positioned adjacent to and opposite of a portion of said first contact section, said first mating face being configured for continuously carrying the traveling material web on said contact section from said first applicator to said first press roll, said first mating face rotating in a direction opposite to said first press roll, said first contact section being configured for supporting the traveling material web opposite said first applicator, said finish-dosing apparatus configured for contacting the travelling material web while the travelling material web is supported by said said portion of first contact section, said first contact section and said first press roll defining a press nip therebetween;

a second applicator for direct application of the medium onto a second side of the traveling material web;

a second rotating press roll for pressing the medium applied by said second applicator into the traveling material web; and a second rotating mating face having a surface defining a second contact section, said second mating face carrying the traveling material web on said surface and rotating in a direction opposite to said second press roll, said second contact section being associated with each of said second applicator and said second press roll, said second contact section and said second press roll defining a press nip therebetween, said second press roll being disposed after said second applicator relative to the direction of travel of the material web.

2. An apparatus for application of a liquid or pasty medium onto a traveling fiber material web having two sides and a direction of travel, said apparatus comprising:

a first applicator for direct application of the medium onto a first side of the traveling material web, said first applicator including:

a predosing apparatus for directly applying a surplus amount of the medium on a corresponding said side of the material web; and a finish-dosing apparatus for dosing said directly applied amount of the medium to a desired final amount of application;

a first rotating press roll for pressing the medium applied by said first applicator into the traveling material web, said first press roll being positioned after said first applicator in the direction of travel; and a first rotating mating face having a surface with a first contact section, said first applicator being positioned adjacent to and directly opposite of a portion of said first contact section, said first mating face being configured for carrying and supporting the traveling material web on said contact section from said first applicator to said first press roll, said finish-dosing apparatus configured for contacting the travelling material web while the travelling material web is supported by said said portion of first contact section, said first mating face rotating in a direction opposite to said first press roll, said first contact section and said first press roll defining a press nip therebetween.

3. An apparatus for application of a liquid or pasty medium onto a traveling fiber material web having two sides and a direction of travel, said apparatus comprising:

two applicators for direct application of the medium onto the two sides of the traveling material web, said two applicators defining a nip therebetween through which the material web travels, each of said two applicators including:

a predosing apparatus for directly applying a surplus amount of the medium on a corresponding said side of the material web; and a finish-dosing apparatus for dosing said directly applied amount of the medium to a desired final amount of application; and two press rolls rotating in opposite directions for pressing the medium applied by said two applicators into the traveling material web, said two press rolls being disposed after said two applicators, relative to the direction of travel of the material web, said two press rolls defining a press nip therebetween through which the material web travels, the rotating directions of said two press rolls corresponding to the direction of travel of the material web;

wherein the material web travels between each of said two applicators, between each of said two press rolls, and between said applicators and said press rolls in a common pass-through plane.

4. The apparatus of claim 3, wherein said two applicators comprise doctor element/pressure chamber applicators.

5. The apparatus of claim 3, wherein said two applicators comprise open-jet nozzle applicators.

6. The apparatus of claim 3, wherein said two applicators comprise doctor element applicators with a liquid sump.

7. The apparatus of claim 6, wherein each said doctor element applicator comprises one of a profiled doctor bar, smooth doctor bar and doctor blade.

8. The apparatus of claim 3, wherein each said press roll has a roll surface, and further comprising at least one heating system for heating said roll surface.

9. The apparatus of claim 3, wherein each said press roll includes a roll surface, and further comprising at least one cleaning apparatus associated with each said respective roll surface.

10. The apparatus according to claim 9, wherein each said cleaning apparatus comprises a scraper blade.

* * * * *